(12) United States Patent
Xia et al.

(10) Patent No.: US 8,885,504 B2
(45) Date of Patent: Nov. 11, 2014

(54) METHOD, APPARATUS AND SYSTEM FOR BANDWIDTH AGGREGATION OF MOBILE INTERNET ACCESS NODE

(75) Inventors: Xin Xia, Beijing (CN); Qun Zhao, Beijing (CN); Yixue Lei, Beijing (CN); Yongsheng Zhang, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 176 days.

(21) Appl. No.: 13/457,539

(22) Filed: Apr. 27, 2012

(65) Prior Publication Data

US 2012/0307658 A1 Dec. 6, 2012

(30) Foreign Application Priority Data

May 31, 2011 (CN) .......................... 2011 1 0145000

(51) Int. Cl.
*H04W 72/04* (2009.01)
*H04L 12/803* (2013.01)
*H04L 12/835* (2013.01)
*H04W 92/20* (2009.01)
*H04W 72/00* (2009.01)
*H04W 88/10* (2009.01)
*H04L 12/801* (2013.01)
*H04L 12/841* (2013.01)

(52) U.S. Cl.
CPC .............. *H04L 47/122* (2013.01); *H04L 47/30* (2013.01); *H04W 92/20* (2013.01); *H04W 72/00* (2013.01); *H04W 88/10* (2013.01); *H04L 47/14* (2013.01); *H04L 47/28* (2013.01)
USPC ............ 370/252; 370/329; 370/431; 370/449

(58) Field of Classification Search
CPC ...... H04W 28/16; H04W 28/20; H04W 4/006; H04W 72/00; H04W 84/18; H04W 84/20; H04W 16/14; H04W 24/10; H01L 45/00; H01L 12/46; H01L 12/66; H01L 29/12952; H01L 45/16; H01L 45/26; H01L 49/201; H01L 49/205; H01L 49/252
USPC ................... 370/252–25, 329, 431, 449, 346; 455/450, 509, 520
See application file for complete search history.

(56) References Cited

U.S. PATENT DOCUMENTS

| | | | |
|---|---|---|---|
| 6,480,505 B1 * | 11/2002 | Johansson et al. ............. | 370/449 |
| 2002/0085565 A1 * | 7/2002 | Ku et al. ................... | 370/395.42 |
| 2005/0153725 A1 * | 7/2005 | Naghian et al. ............... | 455/520 |
| 2007/0280142 A1 * | 12/2007 | Meier ........................... | 370/254 |
| 2010/0195611 A1 * | 8/2010 | Allen et al. ................... | 370/329 |
| 2011/0142096 A1 * | 6/2011 | Gerhardt et al. .............. | 375/133 |
| 2011/0296006 A1 * | 12/2011 | Krishnaswamy et al. ..... | 709/224 |
| 2012/0307839 A1 * | 12/2012 | Ionescu et al. ................ | 370/431 |

* cited by examiner

*Primary Examiner* — Dang Ton
*Assistant Examiner* — Sai Aung
(74) *Attorney, Agent, or Firm* — Harness, Dickey & Pierce, PLC

(57) ABSTRACT

The embodiment of the disclosure discloses a method, apparatus and system for bandwidth aggregation of a MiAN. The method is applied in an aggregation system. The aggregation system comprises a master MiAN and one or more slave MiANs, the master MiAN and the one or more slave MiANs are connected to a WAN via WAN links respectively corresponding to the master MiAN and the one or more slave MiANs, the master MiAN establishes communication link with the one or more slave MiANs via a proximity interface.

18 Claims, 6 Drawing Sheets

METHOD, APPARATUS AND SYSTEM FOR BANDWIDTH AGGREGATION OF MOBILE INTERNET ACCESS NODE

BACKGROUND OF THE INVENTION

1. Field of the Invention

This disclosure relates to a data communication field, and more particularly to a method, apparatus and system for bandwidth aggregation of a MiAN (Mobile Internet Access Node).

2. Description of the Prior Art

FIG. 1 is a schematic diagram showing a structure of an access network including a MiAN. As shown in FIG. 1, the MiAN is an apparatus having both WAN (wide area network) accessing ability and WLAN (wireless local area network) accessing ability. A WAN interface may access any standard cellular network (such as WCDMA, CDMA, WiMAX, LTE, LET-A) via a WAN link. The WAN interface may be a wireless interface or a wired interface. The WLAN interface may also be a wireless interface based on 802.11 WiFi. Besides these two interfaces, the MiAN may include a proximity interface for communicating with another MiAN. The proximity interface may be realized by different technologies such as Bluetooth, Zigbee and NFC (near field communication) (short distance communication technology), 802.11 WiFi and WiFi direct (wireless communication technology), Ethernet and RJ45 (wired communication technology). The proximity interface may be an independent physical entity interface or a logic interface such as a logic interface sharing a physical entity interface with the WLAN interface. FIG. 2 is a schematic diagram showing a MiAN having a proximity interface and a WLAN interface which share a physical entity interface.

A WiD (wireless Internet device) is a terminal device having a WLAN interface which supports different Internet applications, such as a smart phone, a digital camera and a play station. The wireless Internet terminal and the MiAN connect with each other via a WLAN interface.

Since the WAN link of a MiAN has a limited bandwidth, which is far lower than a bandwidth of the WLAN link, as a rapid increase of a data amount of a mobile terminal service, the bandwidth of the WAN link of the MiAN becomes a bottleneck of the access network, which seriously influences on a use experience of a terminal user using the network.

SUMMARY OF THE INVENTION

A problem to be solved by an embodiment of the disclosure is to provide a method, apparatus and system for bandwidth aggregation of a MiAN, for realizing bandwidth aggregation and sharing of a WAN link of the MiAN.

In order to solve the above problem, some embodiments of the disclosure provide the following technical solution.

A method for bandwidth aggregation of a Mobile Internet Access Node (MiAN), applied in a aggregation system is provided herein. The aggregation system comprises a master MiAN and one or more slave MiANs, the master MiAN and the one or more slave MiANs are connected with a wide area network (WAN) via WAN links respectively corresponding to the master MiAN and the one or more slave MiANs, the master MiAN establishes a communication link with the one or more slave MiANs via a proximity interface. The method comprises steps of: step A, the master MiAN receiving a service flow sent from a wireless Internet device (WiD) to the WAN; step B, the master MiAN selecting a first slave MiAN to send the service flow; and step C, the master MiAN sending the service flow to the first slave MiAN so that the first slave MiAN sends the service flow sent from the master MiAN to the WAN via the WAN link corresponding to the first slave MiAN.

According to some embodiments, the method may further comprise: step A1, between step A and step B, the master MiAN determining whether a route table item is established locally for the service flow and if yes, sending the service flow according to the route table item; otherwise, proceeding to step B.

According to some embodiments, step B may comprise: the master MiAN determining whether the service flow is to be sent through a slave MiAN according to a preset strategy; the master MiAN selecting the first slave MiAN to send the service flow if the result of the determination is yes; and the master MiAN sending the service flow to the WAN via the WAN link corresponding to the master MiAN if the result of the determination is no.

According to some embodiments, the master MiAN determining whether the service flow is to be sent through the slave MiAN according to the preset strategy in step B may comprise: the master MiAN obtaining a current link state parameter of the WAN link corresponding to the master MiAN, wherein the link state parameter comprises at least one of queue length, packet sending delay, throughput, Signal to Noise Ratio (SNR) and path loss; and determining whether the current link state parameter exceeds a preset threshold and if yes, determining the service flow is to be sent through the slave MiAN; otherwise, determining the service flow is not to be sent through the slave MiAN.

According to some embodiments, the master MiAN determining whether the service flow is to be sent through the slave MiAN according to the preset strategy in step B may comprise: determining whether the service flow is a delay sensitive service flow; if yes, determining the service flow is not to be sent through the slave MiAN; and otherwise, determining the service flow is to be sent through the slave MiAN.

According to some embodiments, the master MiAN determining whether the service flow is to be sent through the slave MiAN according to the preset strategy in step B may comprise: determining whether the master MiAN is a MiAN having the most optimal current link state of the WAN link in the aggregation system; if yes, determining the service flow is not to be sent through the slave MiAN; and otherwise, determining the service flow is to be sent through the slave MiAN.

According to some embodiments, the master MiAN may receive the current link state parameters of the respective WAN links transmitted periodically from the slave MiANs, and determine whether the master MiAN is a MiAN having the most optimal current link state of the WAN link in the aggregation system based on the current link state parameters of the master MiAN and the slave MiANs, wherein the link state parameter comprises at least one of queue length, packet sending delay, throughput, SNR and path loss.

According to some embodiments, the master MiAN selecting the first slave MiAN to send the service flow in step B may comprise: the master MiAN selecting a slave MiAN having the most optimal current link state from the one or more slave MiANs as the first slave MiAN, based on the current link state parameters of the slave MiANs.

According to some embodiments, the master MiAN selecting the first slave MiAN to send the service flow in step B may comprise: selecting randomly one slave MiAN from the one or more slave MiANs as the first slave MiAN.

According to some embodiments, the proximity interface may be a logic interface for sharing a wireless local area network (WLAN) interface; the master MiAN establishing a communication link with the one or more slave MiANs via the proximity interface may comprise: the master MiAN connecting and communicating with the one or more slave MiANs via the WLAN interface, wherein the master MiAN and the one or more slave MiANs work at a same WLAN frequency band, the one or more slave MiANs work in a mobile station mode but not in an access point mode, and associate with the master MiAN via the respective WLAN interfaces.

According to some embodiments, the method may further comprise steps before step A: the master MiAN maintaining address information of the one or more slave MiANs and establishing a plurality of binding relations with the one or more slave MiANs; and the master MiAN establishing communication links with the one or more slave MiANs via the proximity interface according to the address information.

Another embodiment of the disclosure provides a master MiAN, connected to a WAN via a WAN link, establishing a communication link with one or more slave MiANs via a proximity interface, comprising: a receiving unit, configured to receive a service flow sent from a WiD to the WAN; a selecting unit, configured to select a first slave MiAN to send the service flow; and a first sending unit, configured to send the service flow to the first slave MiAN so that the first slave MiAN sends the service flow sent from the master MiAN to the WAN via the WAN link corresponding to the first slave MiAN.

According to some embodiments, the master MiAN may further comprise a determining unit and a second sending unit, wherein the determining unit is configured to determine whether a route table item is established locally for the service flow after the receiving unit receives the service flow; and if yes, trigger the second sending unit to send the service flow according to the route table item; otherwise, trigger the selecting unit.

According to some embodiments, the selecting unit may be configured to determine whether the service flow is to be sent through a slave MiAN according to a preset strategy, and select the first slave MiAN to send the service flow if the result of the determination is yes; the master MiAN may further comprise a third sending unit configured to send the service flow to the WAN via the WAN link corresponding to the master MiAN if the result of the determination is no.

According to some embodiments, the selecting unit may comprise: a parameter obtaining unit, configured to obtain a current link state parameter of the WAN link corresponding to the master MiAN, wherein the link state parameter comprises at least one of queue length, packet sending delay, throughput, SNR and path loss; and a threshold determining unit, configured to determine whether the current link state parameter exceeds a preset threshold and if yes, determining the service flow is to be sent through the slave MiAN; otherwise, determining the service flow is not to be sent through the slave MiAN.

According to some embodiments, the selecting unit may comprise: a service determining unit, configured to determine whether the service flow is a delay sensitive service flow; if yes, determine the service flow is not to be sent through the slave MiAN; otherwise, determine the service flow is to be sent through the slave MiAN.

According to some embodiments, the selecting unit may comprise: a state determining unit, configured to determine whether the master MiAN is a MiAN having the most optimal current link state of the WAN link in the aggregation system; if yes, determine the service flow is not to be sent through the slave MiAN; otherwise, determine the service flow is to be sent through the slave MiAN.

According to some embodiments, the master MiAN may further comprise: a parameter receiving unit, configured to receive the current link state parameters of the respective WAN links transmitted periodically from the slave MiANs, wherein the link state parameter comprises at least one of queue length, packet sending delay, throughput, SNR and path loss; and wherein the state determining unit is configured to determine whether the master MiAN is a MiAN having the most optimal current link state of the WAN link in the aggregation system based on the current link state parameters of the master MiAN and the slave MiANs.

According to some embodiments, the selecting unit may further comprise: a first processing unit, configured to select a slave MiAN having the most optimal current link state from the one or more slave MiANs as the first slave MiAN, based on the current link state parameters of the slave MiANs.

According to some embodiments, the selecting unit may further comprise: a second processing unit, configured to select randomly one slave MiAN from the one or more slave MiANs as the first slave MiAN.

According to some embodiments, the proximity interface may be an interface configured to realize a wired or wireless mutual communication.

According to some embodiments, the master MiAN may further comprise: a WLAN interface configured to connect with each slave MiAN of the one or more slave MiANs, wherein the proximity interface is a logic interface for sharing the WLAN interface, the master MiAN and the one or more slave MiANs work at a same WLAN frequency band, the one or more slave MiANs work in a mobile station mode and associate with the master MiAN via the WLAN interface.

According to some embodiments, the master MiAN may further comprise: a binding management unit, configured to maintain address information of the one or more slave MiANs, establish binding relations with the one or more slave MiANs, and establish communication links with the one or more slave MiANs via the proximity interface according to the address information.

Another embodiment of the disclosure provides a slave MiAN, connected to a WAN via a WAN link and establishing a communication link with a master MiAN via a proximity interface, comprising: a receiving unit, configured to receive a first service flow sent from the WiD to the master MiAN and determined as the service flow sent by the slave MiAN; and a sending unit, configured to send the first service flow to the WAN via the WAN link corresponding to the slave MiAN.

According to some embodiments, the slave MiAN may further comprise: a binding management unit, configured to maintain address information of the master MiAN, establish a binding relation with the master MiAN, and establish a communication link with the master MiAN via the proximity interface according to the address information.

According to some embodiments, the slave MiAN may further comprise: a parameter transmitting unit, configured to transmit the current link state parameters of the WAN links corresponding to the slave MiANs periodically to the master MiAN, and enable the master MiAN to select the MiAN for sending the first service flow based on the current link state parameters of the master MiAN and the slave MiANs, wherein the link state parameter comprises at least one of queue length, packet sending delay, throughput, SNR and path loss.

Another embodiment of the disclosure provides a system for bandwidth aggregation of a MiAN, comprising a master MiAN and one or more slave MiANs, wherein the master MiAN and the one or more slave MiANs are connected with a WAN via WAN links respectively corresponding to the master MiAN and the one or more slave MiANs, the master MiAN establishes a communication link with the one or more slave MiANs via a proximity interface, wherein the master MiAN is configured to receive a service flow sent from a WiD to the WAN, determine whether the service flow is to be sent through a slave MiAN according to a preset strategy and select a first slave MiAN to send the service flow if a result of the determination is yes, and thereafter send the service flow to the first slave MiAN; and the first slave MiAN is configured to send the service flow sent from the master MiAN to the WAN via the WAN link corresponding to the first slave MiAN.

Based on the above description, according to the method, apparatus and system for bandwidth aggregation of the MiAN, when the master MiAN sends the service flow to the WAN, the service flow is no longer sent via the WAN link of the master MiAN but via the WAN link of the slave MiANs so that aggregation and sharing of the WAN links between different MiANs are realized. For example, when the bandwidth of the WAN link of the master MiAN is limited, the bandwidth of the slave MiANs may be used to increase the bandwidth and throughput of a wireless terminal and to improve an experience of a terminal user. In addition, a structure of the current cellular network or of the network devices or of the wireless terminal device needs not be modified, only a function of the current MiAN needs a software update, thus a simple implementation and low cost can be realized.

DETAILED DESCRIPTION OF THE PREFERRED EMBODIMENTS

According to the present disclosure, bandwidths of WAN links of two or more MiANs are aggregated to realize a bandwidth sharing of WAN links of MiANs so as to solve a bottleneck problem of the WAN link and to improve an experience of a terminal user.

The present disclosure will be further explained with reference to the accompanied drawings.

An embodiment of the disclosure provides a method for bandwidth aggregation of a MiAN, applied in an aggregation system. The aggregation system comprises a master MiAN and one or more slave MiANs, the master MiAN and the one or more slave MiANs are connected with a WAN via a corresponding WAN link respectively, the master MiAN establishes communication links with the one or more slave MiANs via a proximity interface. Specifically, the master MiAN and the slave MiANs are all connected with an access gateway of an operator via corresponding WAN links so as to access a core network of the cellular network or Internet.

Figure 3:
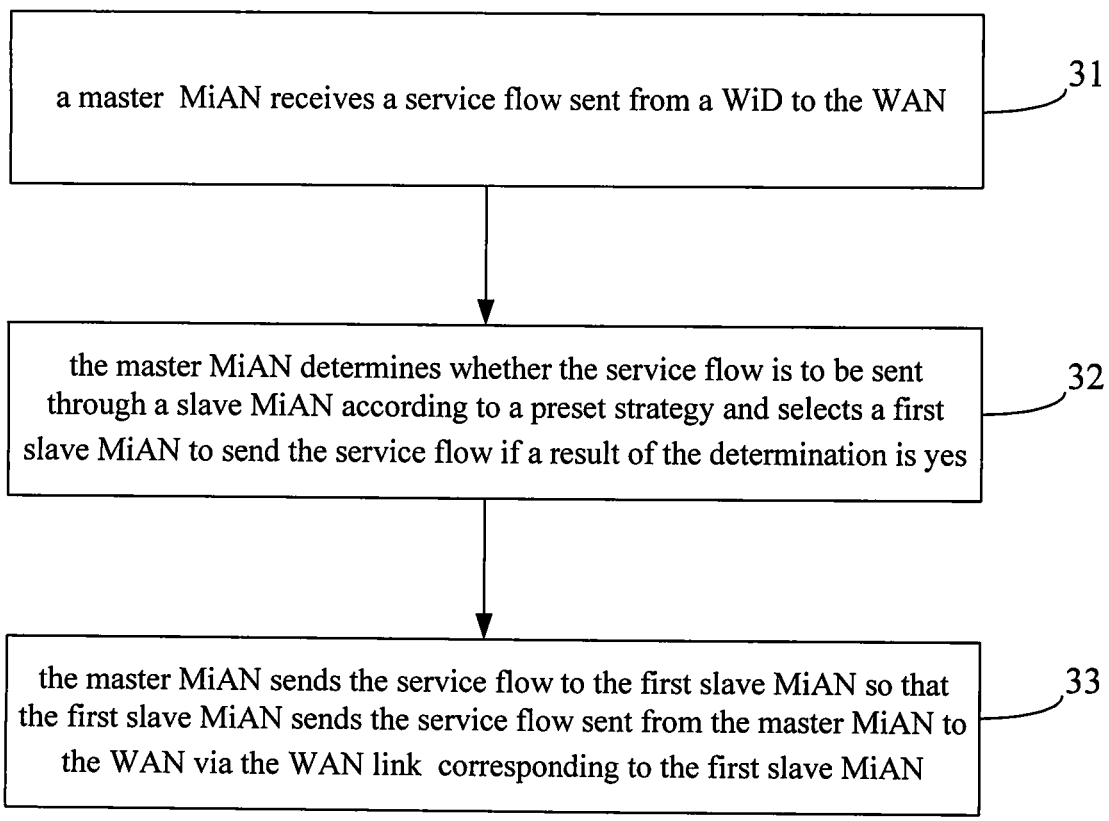
FIG. 3 is a flow chart showing a method for bandwidth aggregation of a MiAN according to an embodiment of the disclosure.

With reference to FIG. 3, the method according to an embodiment of the disclosure comprises the following steps.

In step 31, the master MiAN may receive a service flow sent from a WiD to the WAN.

Each WiD may connect with the master MiAN so as to access the Internet through the master MiAN. When the WiD accesses the Internet, it will send the service flow to the WAN through the master MiAN, and for example, the service flow here may be an IP packet or other forms of packet.

In step 32, the master MiAN may select a first slave MiAN to send the service flow.

In step 32, specifically, the master MiAN may determine whether the service flow needs to be sent through a slave MiAN, according to a preset strategy and select randomly one slave MiAN from all the slave MiANs to be the first slave MiAN or select one slave having the most optimal current link state from all the slave MiANs to be the first slave MiAN, if a result of the above determination is yes. Thus, when the master MiAN sends the service flow to the WAN, it will not use its own WAN interface and WAN link to send the service flow, but determine whether the service flow needs to be sent through the slave MiAN according to the preset strategy and when necessary, it will make use of the bandwidth of the WAN link of the slave MiAN effectively.

In step 33, the master MiAN may send the service flow to the first slave MiAN so that the first slave MiAN sends the service flow sent from the master MiAN to the WAN via the corresponding WAN link.

The service flow is not sent to the WAN via the WAN link of the master MiAN but is sent to the first slave MiAN via the proximity interface. When the first slave MiAN receives the service flow from the master MiAN, it will send the service flow to the WAN via its own WAN link. By transferring the service flow through the first slave MiAN, the WAN links of MiANs may be aggregated and shared. For example, when the bandwidth of the WAN link of the master MiAN is limited, the bandwidth of the slave MiANs may be used to improve an experience of a terminal user.

In step 32, when the master MiAN determines the service flow does not need to be sent through the slave MiAN according to the preset strategy, the master MiAN may send the service flow to the WAN via its own WAN link and the process ends. Thus, the service flow is still sent to the WAN through the master MiAN.

Figure 4:
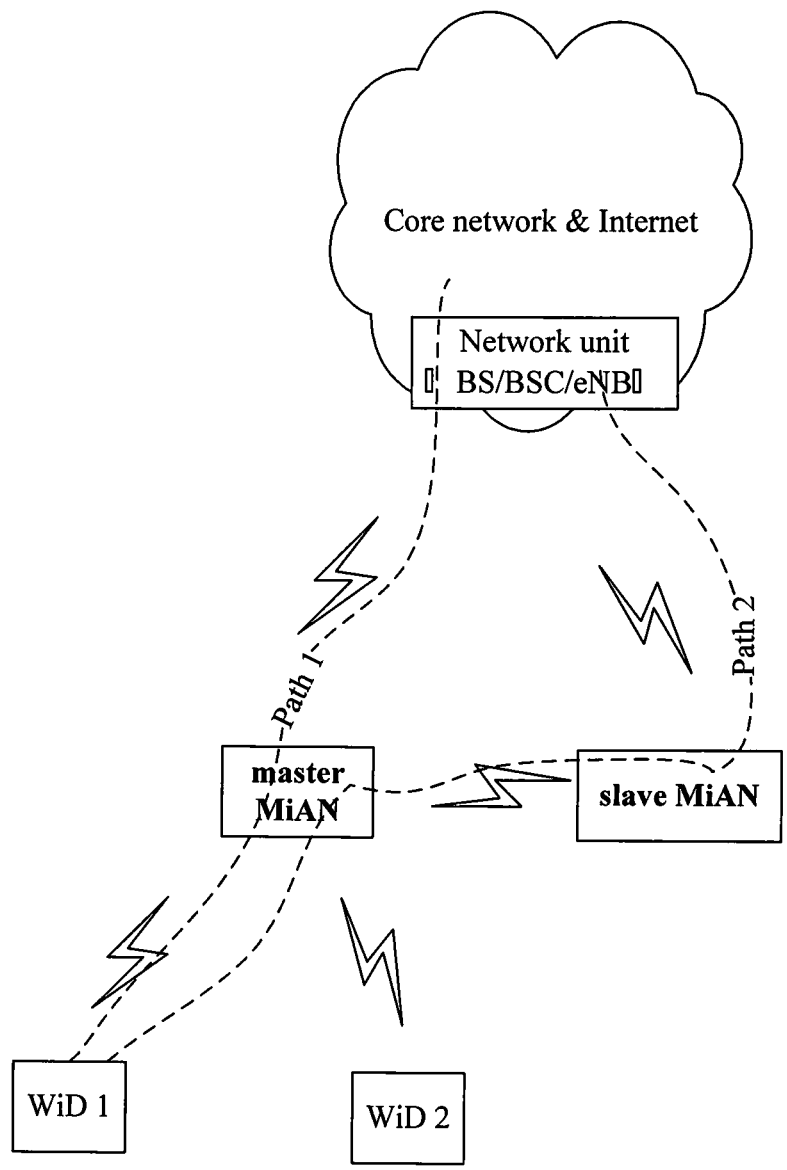
FIG. 4 is a schematic diagram showing a method for sending a service flow according to an embodiment of the disclosure.

FIG. 4 is a schematic diagram showing a method for sending a service flow according to an embodiment of the disclosure. In FIG. 4, only one slave MiAN and two WiDs (WiD1 and WiD2) are shown. Each MiAN may be connected with a network unit (such as BS, BSC or eNB) via the WAN link so as to be connected with the core network or Internet. The master MiAN establishes the communication with each slave MiAN via the proximity interface. According to the embodiment of the disclosure, MiANs are categorized into a master MiAN and one or more slave MiANs, in which the master MiAN is responsible for an access control of a terminal user and a sending control of the service flow to the MAN while the slave MiANs are responsible for sending the service flow sent from the master MiAN. When the master MiAN sends the service flow via path 1, it sends the service flow via its own WAN link. When the master MiAN needs a slave MiAN to share the service flow, it will send the service flow sent from WiD1 via path 2 to the WAN, in which case the WAN link of the slave MiAN is used so that multiple MiANs may aggregate and share WAN links to improve the experience of users.

Figure 5:
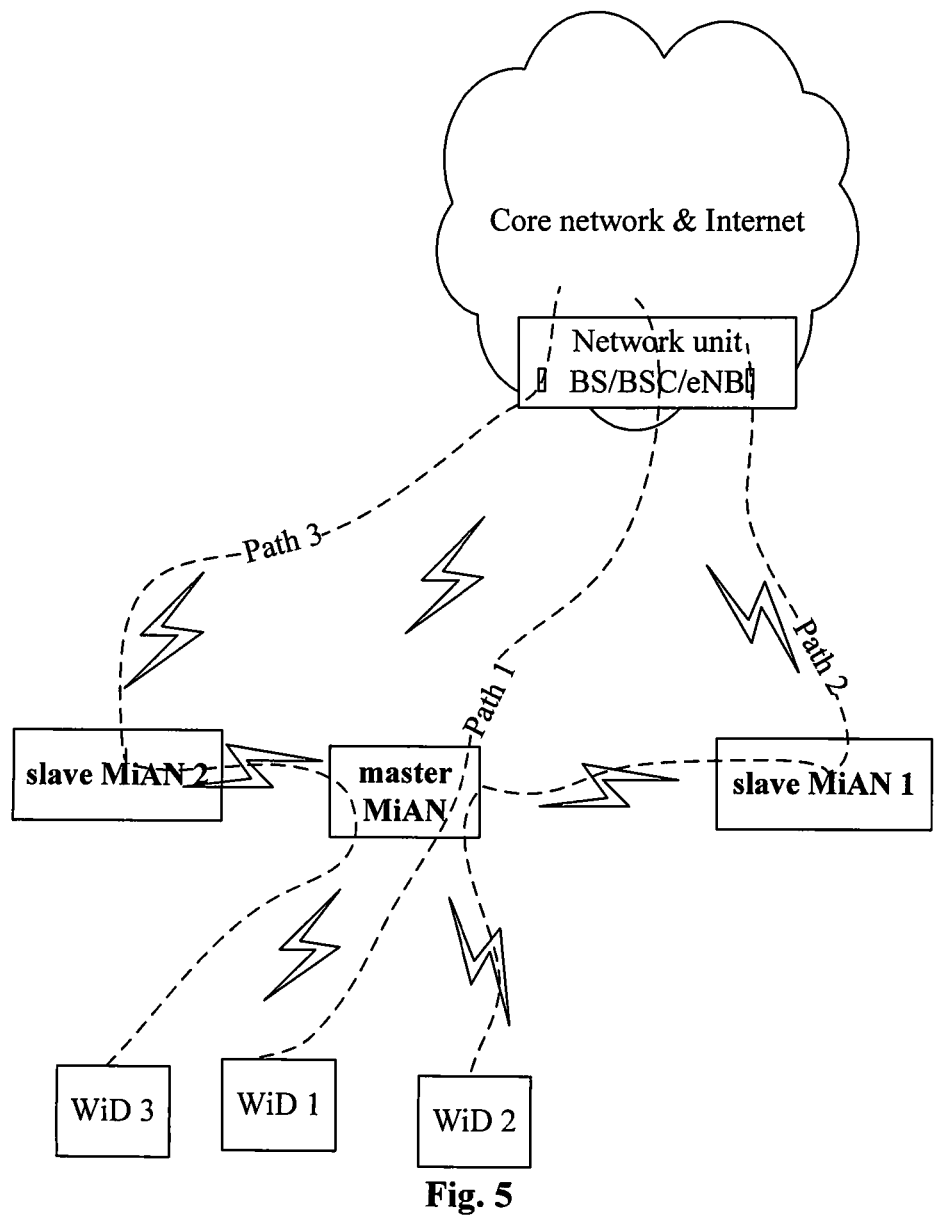
FIG. 5 is a schematic diagram showing another method for sending a service flow according to an embodiment of the disclosure.

FIG. 5 is a schematic diagram showing another method for sending a service flow according to an embodiment of the disclosure. In FIG. 5, two slave MiANs (of course, there could be more slave MiANs) and three WiDs are shown. When the master MiAN sends the service flow via path 1, it sends the service flow via its own WAN link. When the master MiAN sends the service flow sent from WiD2 via path 2, the service flow is sent via the WAN link of the slave MiAN 1. When the master MiAN sends the service flow sent from WiD3 via path 3, the service flow is sent via the WAN link of the slave MiAN 2. FIG. 5 is only for illustrative purpose and different service flows sent from a same WiD may be sent to different slave MiANs.

The master MiAN and the slave MiANs process the sending of the service flow. According to the embodiment, the terminal does not need to be improved and the sending of the service flow is transparent to terminal users.

Before step 31, the master MiAN may establish a binding relation with each slave MiAN so as to determine whether the slave MiANs have been bond with the master MiAN. Address information of each slave MiAN (including IP address and MAC address) may be configured at the master MiAN and address information of the master MiAN (including IP address and MAC address) may be configured at each slave MiAN. Of course, the maim MiAN and the slave MiANs may negotiate to establish the binding relations therebetween.

In order to realize the same sending process of the same service flow, according to the embodiment, there may be a step 31A between step 31 and step 32.

In step 31A, the master MiAN may determine whether a route table item is established locally for the service flow and if yes, send the service flow according to the route table item; otherwise, it proceeds to step 32.

Here, the same service flow may be represented by a group having five elements (source IP address, source port, destination IP address, destination port and transmission layer protocol number). Conventionally, the service flow to the WAN may be sent by the master MiAN to its own WAN interface according to a default route in the routing table so as to send the service flow to a default access gateway of an operator. In the embodiment, in step 31A, the master MiAN may determine whether a route table item is established locally for the service flow. If yes, it means the same service flow has been sent and a route table item of sending the service flow is stored in the route table. Therefore, the service flow may be sent according to the route table item so as to guarantee the same service flow is sent via the same path. If no, it proceeds to step 32 and when the first slave MiAN is selected to send the service flow, the route table may be modified to establish a new route table item. A next address (gateway) for the new route table item is the first slave MiAN and the interface is the proximity interface between the master MiAN and the first slave MiAN. The route table may be maintained according to the conventional technology.

According to some embodiments, the master MiAN may use a plurality of preset strategies in step 32 so as to dynamically allocate service flows between a plurality of slave MiANs according to the practice. Examples will be given as follows.

The first strategy is to preset a corresponding threshold according to a link state parameter of the WAN link of the master MiAN. In step 32, a current link state parameter of the WAN link corresponding to the master MiAN is obtained by the master MiAN. The master MiAN determines whether the current link state parameter exceeds a preset threshold and if yes, determining the service flow is to be sent through the slave MiAN; otherwise, determines the service flow is not to be sent through the slave MiAN and may be sent directly through the master MiAN.

Specifically, the link state parameter of the WAN link may be represented by any one of queue length, packet sending delay, throughput, Signal to Noise Ratio (SNR) and path loss and or two of them or more. Therefore, a corresponding threshold may be set with respect to each parameter and when the parameter exceeds the corresponding threshold, it is determined that the service flow needs to be sent through the slave MiAN.

The second strategy is to determine a corresponding way to send the service flow according to the type of the service flow. Specifically, if the service flow is a delay sensitive service flow, it is determined the service flow is not to be sent through the slave MiAN; otherwise, it is determined the service flow is to be sent through the slave MiAN. Thus, the master MiAN preferably send the delay sensitive service flow via its own WAN link in order to reduce hops of transferring and transferring delay; and for the service flow not sensitive to delay, the master MiAN may use a WAN link of the slave MiAN.

Specifically, the delay sensitive service may comprise voice service, fax service, video service and TCP application service, which may have requirements for transmission delay. For example, the fax service allows a maximum transmission delay of 90 ms. The administrator may also set the delay sensitive service by himself/herself.

The third strategy is to select the MiAN having the most optimal current link state to send the service flow according to the current link states of all the MiANs. Here, in above step 32, determining whether the service flow is to be sent through a slave MiAN according to a preset strategy may comprise: determining whether the master MiAN is a MiAN current having the most optimal current link state in the aggregation system; if yes, determining the service flow is not to be sent through the slave MiAN; and if no, determining the service flow is to be sent through the slave MiAN.

With regard to the third strategy, the master MiAN may receive the current link state parameters of the respective WAN links transmitted periodically from the slave MiANs, and determine whether the master MiAN is a MiAN having the most optimal current link state of the WAN link in the aggregation system based on the current link state parameters of the master MiAN and the slave MiANs, wherein the link state parameter comprises at least one of queue length, packet sending delay, throughput, SNR and path loss. When the master MiAN is not the MiAN having the most optimal current link state, the master MiAN may select a slave MiAN having the most optimal current link state from the slave MiANs as the first slave MiAN, based on the current link state parameters of the slave MiANs.

In the embodiment, two or more strategies may be combined to make a determination. For example, if the first strategy and the second strategy are combined, in step 32, determining whether the service flow is to be sent through a slave MiAN according to a preset strategy may comprise: obtaining a current link state parameter of the WAN link of the master MiAN; determining whether the link state parameter exceeds the preset parameter threshold; if yes, determining whether the service flow is to be sent through the slave MiAN; and otherwise, further determining whether the service flow is a delay sensitive service flow; if the service flow is the delay sensitive service flow, determining the service flow is to be sent through the master MiAN; and if service flow is not the delay sensitive service flow, determining the service flow is to be sent through the slave MiAN.

By using the combination of the two strategies, the WAN link bandwidth resource of the slave MiAN may be used effectively. Meanwhile, when the master MiAN has enough WAN link bandwidth, the transferring delay requirement of the delay sensitive service is preferably guaranteed.

The above strategies are only examples of the strategies that may be used in the embodiments and do not mean to limit the disclosure. Other strategies may be used to determine whether the service flow is to be sent through the slave MiAN and will not be illustrated in detail here.

Figure 1:
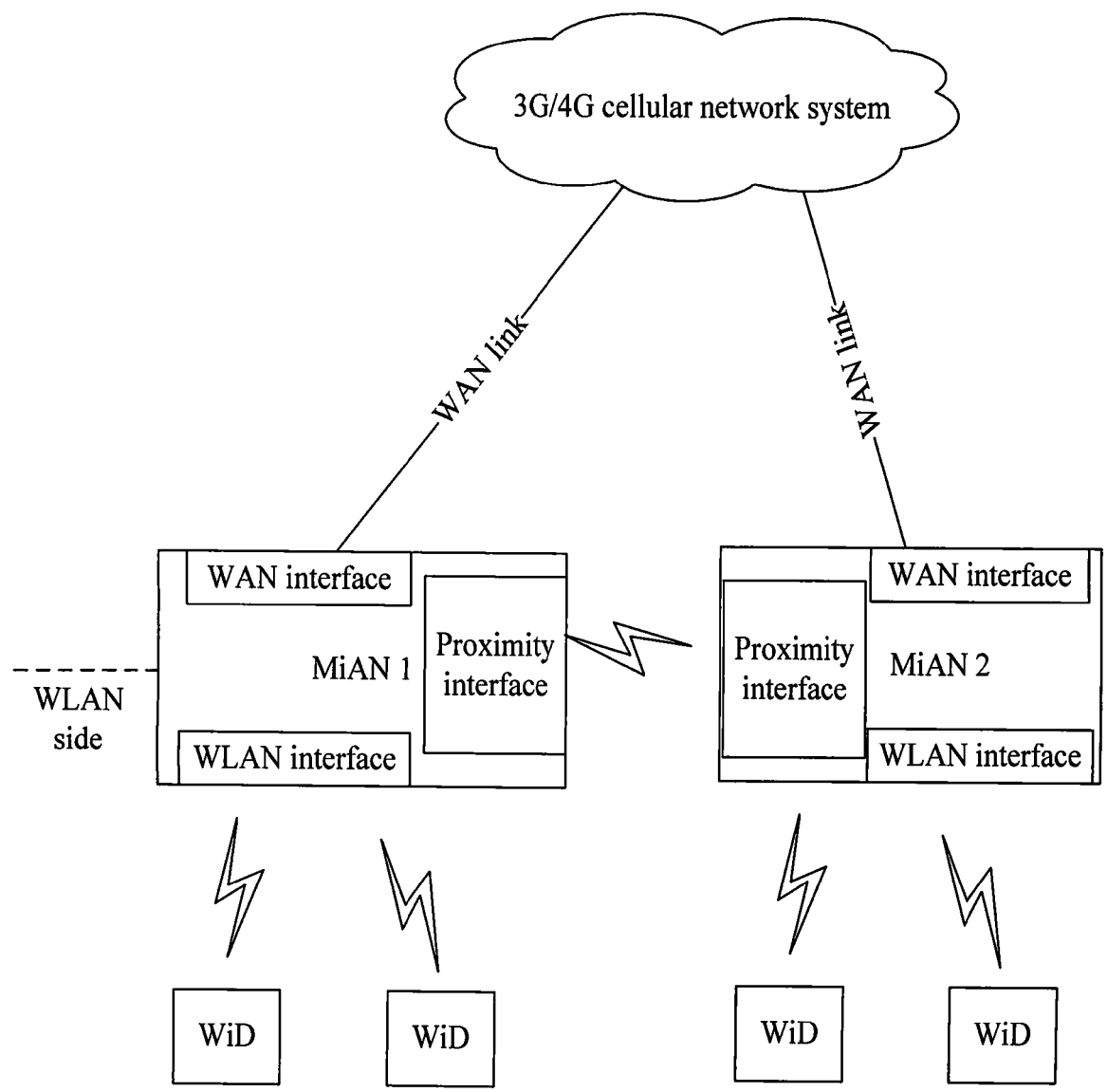
FIG. 1 is a schematic diagram showing a structure of an access network including a MiAN according to prior arts.
Figure 2:
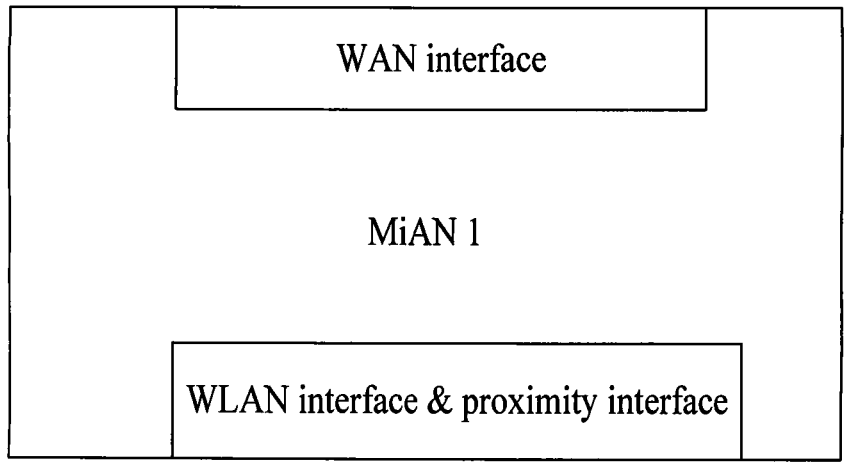
FIG. 2 is a schematic diagram showing a MiAN having a proximity interface and a WLAN interface which share a physical entity interface according to prior arts.

Each slave MiAN may connect and communicate with the master MiAN via the proximity interface. The proximity interface is the interface that may realize a mutual communication in any wired or wireless way. The proximity interface may be realized by different technologies such as Bluetooth, Zigbee and NFC (short distance communication technology), 802.11 WiFi and WiFi direct (wireless communication technology), Ethernet and RJ45 (wired communication technology). The proximity interface may be a UWB interface, a WLAN interface, an Ethernet interface, a RJ45 interface etc. In the embodiment, the proximity interface may be an independent physical entity interface or a logic interface such as a logic interface sharing a physical entity interface with the WLAN interface (as shown in FIG. 2).

Specifically, in the embodiment, the master MiAN and the slave MiANs may communicate with each other via the logic proximity interface sharing the WLAN interface. At this time, each MiAN (including the master MiAN and the slave MiANs) all work at the same WLAN frequency band, each slave MiAN works in a mobile station (STA) mode while the master MiAN works in an access point (AP) mode. Each slave MiAN is a mobile station of the master MiAN, associates and connects with the master MiAN via the WLAN interface. At this time, each WiD is associated with the master MiAN; the slave MiANs are not associated with any WiD but associated with the master MiAN as a special terminal. In this implementation, the master MiAN and the slave MiANs connect and communicate with each other via the existing WLAN interface without additional communication interfaces (such as a second wireless network card) or communication medium (such as Bluetooth and Ultra-wideband). Therefore, the function of existing devices may be updated without modifying hardwares and firmwares of the existing MiAN device, which results in a low cost and simple implementation.

The embodiment will be further described with reference to a typical service flow sending and receiving procedure.

Figure 6:
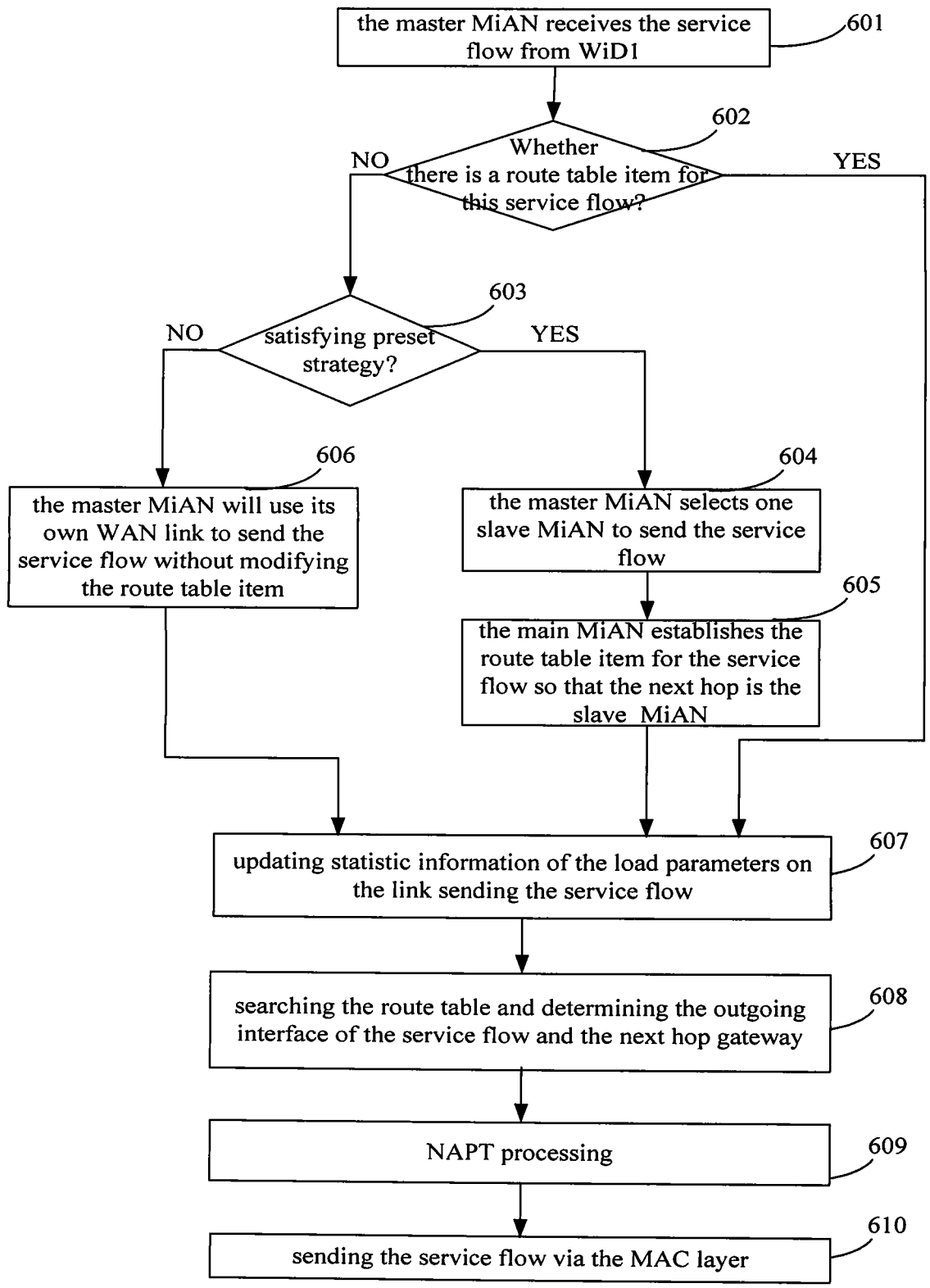
FIG. 6 is a flow chart showing a method for sending a service flow according to an embodiment of the disclosure.

FIG. 6 is a flow chart showing a method for sending a service flow according to an embodiment of the disclosure. As shown in FIG. 6, the method comprises the following steps.

In step 601, terminal WiD1 may send a service flow via a WLAN MAC layer to the master MiAN and the master MiAN receives the service flow.

In step 602, the master MiAN may determine whether there is a route table item for this service flow in its own route table and if yes, it proceeds to step 607; otherwise, proceeds to step 603.

In step 603, the maim MiAN may determine whether the service flow needs to be sent through the slave MiAN according to a preset strategy (which is described above) and if yes, proceeds to step 604; otherwise, it proceeds to step 606.

In steps 604~605, the master MiAN may select one slave MiAN to send the service flow (the way to select is the same as that described above) and establish a route table item for the service flow according to the selected slave MiAN so that an outgoing interface of the route table item is the proximity interface of the master MiAN and the next hop is the selected slave MiAN and then it proceeds to step 607.

In step 606, the master MiAN may determine to use its own WAN link to send the service flow, therefore the route table item does not need to be modified and then it proceeds to step 607.

In step 607, statistic information of the load parameters on the link sending the service flow may be updated according to the link which is used to send the service flow (such as the WAN link of the master MiAN or the WAN link of the slave MiAN). The statistic information comprises at least one of sending queue length, packet sending delay and throughput.

In step 608, the master MiAN may search the route table and select an optimal route table item for the service flow and send the service flow to a corresponding outgoing interface according to the route table item. For example, when the WAN link of the master MiAN is used to send the service flow, the optimal route table item for the service flow may be a default route, the outgoing interface may be the WAN interface of the master MiAN and the next hop may be the access gateway of the operator; when the WAN link of the slave MiAN is used to send the service flow, the optimal route table item for the service flow may be a newly established route table item, the outgoing interface may be the proximity interface of the master MiAN and the next hop may be the slave MiAN.

In steps 609~610, when the service flow reaches the corresponding outgoing interface, the NAPT (Network Address Port Translation) may be performed for the service flow and then the service flow is sent via the MAC layer of the outgoing interface.

For example, when the outgoing interface is the WAN interface of the master MiAN, the service flow is sent to the access gateway of the operator (cellular network) via the WAN link of the master MiAN and then sent to Internet via the gateway.

When the outgoing interface is the proximity interface of the master MiAN, the service flow is sent to the slave MiAN via the proximity interface and the slave MiAN sends the service flow to its own WAN link according to the default route. Similarly, after the NAPT processing, the source IP address and the source port number of the service flow are modified and then the service flow is sent to the access gateway of the operator via the WAN link of the slave MiAN and then sent to Internet via the gateway.

The receiving procedure of the service flow is described as follows.

When the slave MiAN receives an IP packet from the Internet, it searches the NAPT table and modifies the destination IP address and the destination port number of the IP packet and then the IP packet is sent to the master MiAN via the MAC layer of the proximity interface; when the master MiAN receives the IP packet, it searches its local NAPT table and modifies the destination IP address and the destination port number of the IP packet and then sends the IP packet to a corresponding terminal (such as WiD1) via the MAC layer of the WLAN interface.

The processing procedure of the master MiAN receiving the IP packet from the Internet is the same as the prior arts and will not be described in detail here.

By analyzing an application environment of the method according to the embodiment, it turns out that a wireless Internet terminal may greatly improve its bandwidth and throughput, and a gain of the terminal increases linearly as an increase of the number of the MiANs aggregated. Therefore, according to the method of the embodiment, the bandwidth and throughput available to the wireless Internet terminal may be increased and thus user experience may be greatly improved.

In addition, the method of the embodiment may be implemented flexibly without modifying any cellular network architecture and network devices, without additional network devices, without modifying the existing hardwares and firmwares of the MiAN device, and without modifying the wireless Internet terminal. Only the function of the existing MiANs needs software update, which results in a simple implementation and low cost.

Figure 7:
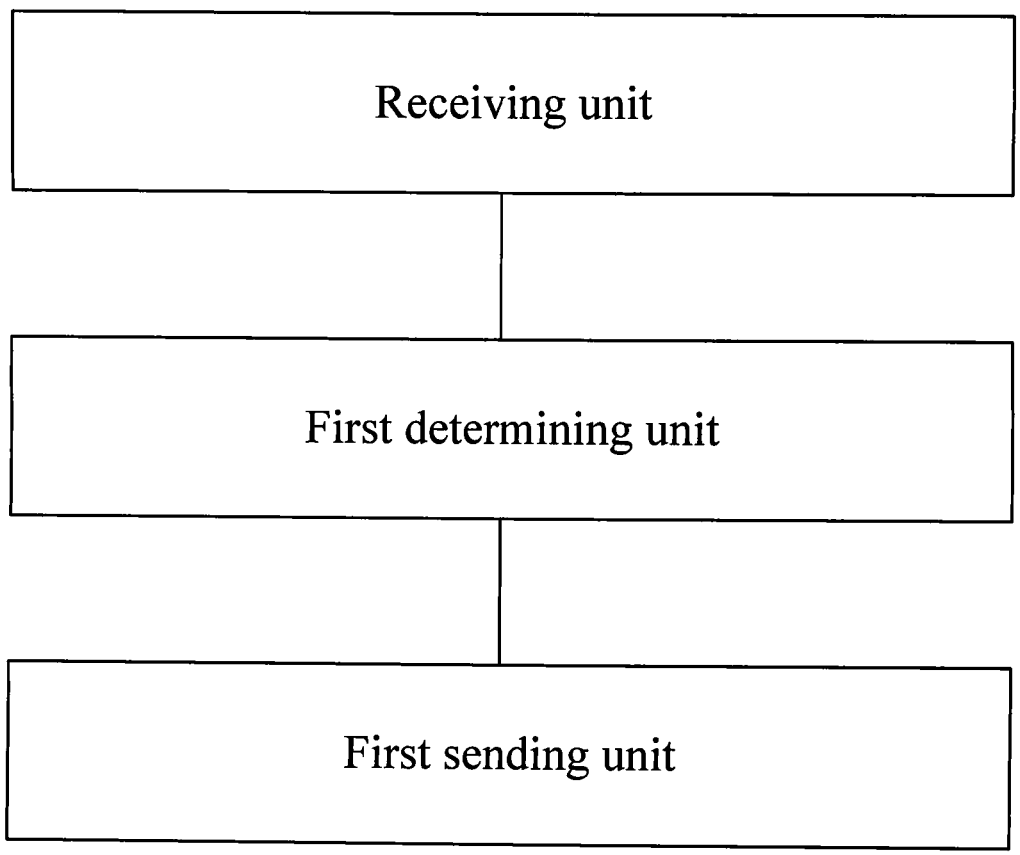
FIG. 7 is a schematic diagram showing a structure of a MiAN according to an embodiment of the disclosure.

Based on the method for bandwidth aggregation of a MiAN, an embodiment of the disclosure further provides a master MiAN, connected to a WAN via a WAN link and establishing a communication link with at least one slave MiANs via a proximity interface. As shown in FIG. 7, the master MiAN comprises: a receiving unit, configured to receive a service flow sent from a WiD to the WAN; a selecting unit, configured to select a first slave MiAN to send the service flow; and a first sending unit, configured to send the service flow to the first slave MiAN so that the first slave MiAN send the service flow sent from the master MiAN to the WAN via the corresponding WAN link.

According to some embodiments, the master MiAN may further comprise a third sending unit, configured to send the service flow to the WAN via the WAN link corresponding to the master MiAN when the first determining unit determines the service flow is not to be sent through a slave MiAN according to a preset strategy.

The proximity interface may be an interface for mutual communication in a wired or wireless way. In one particular embodiment, the proximity interface may be a logic interface configured to share the WLAN interface, the master MiAN and the one or more slave MiANs work at a same WLAN frequency band, the one or more slave MiANs work in a mobile station mode and connect with the master MiAN via the WLAN interface.

According to some embodiments, the master MiAN may further comprise a binding management unit, configured to maintain address information of the one or more slave MiANs, establish binding relations with the one or more slave MiANs and establish a communication link with the one or more slave MiANs via the proximity interface according to the address information.

According to some embodiments, in order to use a same sending path for a same service flow, the master MiAN may further comprise: a determining unit and a second sending unit, the second determining unit is configured to determine whether a route table item is established locally for the service flow after the receiving unit receives the service flow; and if yes, trigger the second sending unit to send the service flow according to the route table item; otherwise, trigger the selecting unit.

According to some embodiments, the master MiAN may determine whether or not the service flow is to be sent via the WAN link corresponding to the slave MiAN according to different strategies. In this situation, the selecting unit may comprise: a parameter obtaining unit, configured to obtain a current link state parameter of the WAN link corresponding to the master MiAN, wherein the link state parameter comprises at least one of queue length, packet sending delay, throughput, SNR and path loss; and a threshold determining unit, configured to determine whether the current link state parameter exceeds a preset threshold and if yes, determining the service flow is to be sent through the slave MiAN; otherwise, determining the service flow is not to be sent through the slave MiAN.

In another embodiment, the selecting unit may comprise: a service determining unit, configured to determine whether the service flow is a delay sensitive service flow; if yes, determine the service flow is not to be sent through the slave MiAN; otherwise, determine the service flow is to be sent through the slave MiAN.

In yet another embodiment, the selecting unit may comprise: a state determining unit, configured to determine whether the master MiAN is a MiAN having the most optimal current link state of the WAN link in the aggregation system; if yes, determine the service flow is not to be sent through the slave MiAN; otherwise, determine the service flow is to be sent through the slave MiAN.

According to some embodiments, the master MiAN may comprise: a parameter receiving unit, configured to receive the current link state parameters of the respective WAN links transmitted periodically from the slave MiANs; and wherein the state determining unit is configured to determine whether the master MiAN is a MiAN having the most optimal current link state of the WAN link in the aggregation system based on the current link state parameters of the master MiAN and the slave MiANs, wherein the link state parameter comprises at least one of queue length, packet sending delay, throughput, SNR and path loss.

As an alternative of the first slave MiAN, the selecting unit may be configured to select a suitable slave MiAN based on the current link states of the WAN links corresponding to all slave MiANs. In this situation, the selecting unit may comprise a first processing unit, configured to select a slave MiAN having the most optimal current link state from the one or more slave MiANs as the first slave MiAN, based on the current link state parameters of the slave MiANs.

As another alternative of the first slave MiAN, the selecting unit may comprise: a second processing unit, configured to select randomly one slave MiAN from the one or more slave MiANs as the first slave MiAN.

The embodiment of the disclosure further provides a slave MiAN, connected to a WAN via a WAN link and establishing a communication link with a master MiAN via a proximity interface, comprising: a receiving unit, configured to receive a first service flow sent from the WiD to the master MiAN and determined as the service flow sent by the slave MiAN; a sending unit, configured to send the first service flow to the WAN via the WAN link corresponding to the slave MiAN; and a binding management unit, configured to maintain address information of the master MiAN, establish a binding relation with the master MiAN, and establish a communication link with the master MiAN via the proximity interface according to the address information.

According to some embodiments, the slave MiAN may further comprise: a parameter transmitting unit, configured to transmit the current link state parameters of the WAN links corresponding to the slave MiANs periodically to the master MiAN, and enable the master MiAN to select the MiAN for sending the first service flow based on the current link state parameters of the master MiAN and the slave MiANs, wherein the link state parameter comprises at least one of queue length, packet sending delay, throughput, SNR and path loss.

In this way, the master MiAN may receive the current link state parameters of the respective WAN links transmitted periodically from the slave MiANs, and determine whether the master MiAN is a MiAN having the most optimal current link state of the WAN link in the aggregation system based on the current link state parameters of the master MiAN and the slave MiANs, and then determine to employ its own or other slave MiANs to send the service flow from the WiD. Specifically speaking, when the slave MiAN is determined to send the service flow, the slave MiAN having the most optimal current link state may be selected.

In the embodiment, the structure of the slave MiAN may be the same as the above master MiAN. In practice, a corresponding unit may be activated according to whether the MiAN is a master MiAN or a slave MiAN.

Lastly, an embodiment of the disclosure provides a system for bandwidth aggregation at a MiAN, comprising a master MiAN and one or more slave MiANs, wherein the master MiAN and the one or more slave MiANs are connected with a WAN via WAN links respectively corresponding to the master MiAN and the one or more slave MiANs, the master MiAN establishes a communication link with the one or more slave MiANs via a proximity interface, wherein the master MiAN is configured to receive a service flow sent from a WiD to the WAN, determine whether the service flow is to be sent through a slave MiAN according to a preset strategy and when yes, select a first slave MiAN to send the service flow and thereafter send the service flow to the first slave MiAN; and the first slave MiAN is configured to send the service flow from the master MiAN to the WAN via the WAN link corresponding to the first slave MiAN.

Specifically, the structure of the master MiAN is described with reference to FIG. 7 above and the structure of the slave MiAN is also described above and will not be illustrated in detail here.

Although explanatory embodiments have been shown and described, it would be appreciated by those skilled in the art that changes, alternatives, and modifications all falling into the scope of the claims and their equivalents may be made in the embodiments without departing from spirit and principles of the disclosure.

What is claimed is:

1. A method for bandwidth aggregation of a Mobile Internet Access Node (MiAN) which is an apparatus having both wide area network (WAN) accessing ability and wireless local area network (WLAN) accessing ability, applied in an aggregation system, wherein the aggregation system comprises:
a master MiAN and one or more slave MiANs, the master MiAN and the one or more slave MiANs are connected with a WAN via WAN links respectively corresponding to the master MiAN and the one or more slave MiANs, the master MiAN establishes a communication link with the one or more slave MiANs via a proximity interface, the method comprising steps of:
step A, the master MiAN receiving a service flow sent from a wireless Internet device (WiD) to the WAN;
step A1, the master MiAN determining whether a route table item is established locally for the service flow and if yes, sending the service flow according to the route table item; otherwise, proceeding to step B;
step B, the master MiAN determining whether the service flow is to be sent through a slave MiAN according to a preset strategy; the master MiAN selecting a first slave MiAN to send the service flow if the result of the determination is yes; and the master MiAN sending the service flow to the WAN via the WAN link corresponding to the master MiAN if the result of the determination is no; and
step C, the master MiAN sending the service flow to the first slave MiAN so that the first slave MiAN sends the service flow sent from the master MiAN to the WAN via the WAN link corresponding to the first slave MiAN;
wherein the master MiAN determining whether the service flow is to be sent through the slave MiAN according to the preset strategy in step B comprises:
the master MiAN obtaining a current link state parameter of the WAN link corresponding to the master MiAN, wherein the link state parameter comprises at least one of queue length, packet sending delay, throughput, Signal to Noise Ratio (SNR) and path loss; and
determining whether the current link state parameter exceeds a preset threshold and if yes, determining the service flow is to be sent through the slave MiAN; otherwise, determining the service flow is not to be sent through the slave MiAN.

2. A method for bandwidth aggregation of a Mobile Internet Access Node (MiAN) which is an apparatus having both wide area network (WAN) accessing ability and wireless local area network (WLAN) accessing ability, applied in an aggregation system, wherein the aggregation system comprises:
a master MiAN and one or more slave MiANs, the master MiAN and the one or more slave MiANs are connected with a WAN via WAN links respectively corresponding to the master MiAN and the one or more slave MiANs, the master MiAN establishes a communication link with the one or more slave MiANs via a proximity interface, the method comprising steps of:
step A, the master MiAN receiving a service flow sent from a wireless Internet device (WiD) to the WAN;
step A1, the master MiAN determining whether a route table item is established locally for the service flow and if yes, sending the service flow according to the route table item; otherwise, proceeding to step B;
step B, the master MiAN determining whether the service flow is to be sent through a slave MiAN according to a preset strategy; the master MiAN selecting a first slave MiAN to send the service flow if the result of the determination is yes; and the master MiAN sending the service flow to the WAN via the WAN link corresponding to the master MiAN if the result of the determination is no; and
step C, the master MiAN sending the service flow to the first slave MiAN so that the first slave MiAN sends the service flow sent from the master MiAN to the WAN via the WAN link corresponding to the first slave MiAN;
wherein the master MiAN determining whether the service flow is to be sent through the slave MiAN according to the preset strategy in step B comprises:
determining whether the service flow is a delay sensitive service flow;
if yes, determining the service flow is not to be sent through the slave MiAN; and
otherwise, determining the service flow is to be sent through the slave MiAN.

3. A method for bandwidth aggregation of a Mobile Internet Access Node (MiAN) which is an apparatus having both wide area network (WAN) accessing ability and wireless local area network (WLAN) accessing ability, applied in an aggregation system, wherein the aggregation system comprises:
a master MiAN and one or more slave MiANs, the master MiAN and the one or more slave MiANs are connected with a WAN via WAN links respectively corresponding to the master MiAN and the one or more slave MiANs, the master MiAN establishes a communication link with the one or more slave MiANs via a proximity interface, the method comprising steps of:

step A, the master MiAN receiving a service flow sent from a wireless Internet device (WiD) to the WAN;

step A1, the master MiAN determining whether a route table item is established locally for the service flow and if yes, sending the service flow according to the route table item; otherwise, proceeding to step B;

step B, the master MiAN determining whether the service flow is to be sent through a slave MiAN according to a preset strategy; the master MiAN selecting a first slave MiAN to send the service flow if the result of the determination is yes; and the master MiAN sending the service flow to the WAN via the WAN link corresponding to the master MiAN if the result of the determination is no; and step C, the master MiAN sending the service flow to the first slave MiAN so that the first slave MiAN sends the service flow sent from the master MiAN to the WAN via the WAN link corresponding to the first slave MiAN;

wherein the master MiAN determining whether the service flow is to be sent through the slave MiAN according to the preset strategy in step B comprises:

determining whether the master MiAN is a MiAN having the most optimal current link state of the WAN link in the aggregation system;

if yes, determining the service flow is not to be sent through the slave MiAN; and otherwise, determining the service flow is to be sent through the slave MiAN.

4. The method according to claim 3, wherein the master MiAN receives the current link state parameters of the respective WAN links transmitted periodically from the slave MiANs, and determines whether the master MiAN is a MiAN having the most optimal current link state of the WAN link in the aggregation system based on the current link state parameters of the master MiAN and the slave MiANs, wherein the link state parameter comprises at least one of queue length, packet sending delay, throughput, SNR and path loss.

5. The method according to claim 4, wherein the master MiAN selecting the first slave MiAN to send the service flow in step B comprises:

the master MiAN selecting a slave MiAN having the most optimal current link state out of the one or more slave MiANs as the first slave MiAN, based on the current link state parameters of the slave MiANs.

6. The method according to claim 1, wherein the master MiAN selecting the first slave MiAN to send the service flow in step B comprises:

selecting randomly one slave MiAN out of the one or more slave MiANs as the first slave MiAN.

7. The method according to claim 1, wherein the proximity interface is an interface for realizing a wired or wireless mutual communication.

8. The method according to claim 7, wherein the proximity interface is a logic interface for sharing a WLAN interface;

the master MiAN establishes a communication link with the one or more slave MiANs via the proximity interface comprises:

the master MiAN connecting and communicating with the one or more slave MiANs via the WLAN interface, wherein the master MiAN and the one or more slave MiANs work at a same WLAN frequency band, the one or more slave MiANs work in a mobile station mode but not in an access point mode, and associate with the master MiAN via the respective WLAN interfaces.

9. The method according to claim 1, further comprising steps before step A:

the master MiAN maintaining address information of the one or more slave MiANs and establishing binding relations with the one or more slave MiANs; and the master MiAN establishing communication links with the one or more slave MiANs via the proximity interface according to the address information.

10. A Mobile Internet Access Node (MiAN), which is an apparatus having both wide area network (WAN) accessing ability and wireless local area network (WLAN) accessing ability, and is connected to a WAN via a WAN link, establishing a communication link with one or more slave MiANs via a proximity interface, comprising:

a memory storing instructions; and a processor coupled to the memory running the instructions, wherein the processor is configured to:

receive a service flow sent from a wireless Internet device (WiD) to the WAN;

determine whether a route table item is established locally for the service flow after receiving the service flow; and if yes, send the service flow according to the route table item; otherwise, select the first slave MiAN to send the service flow;

determine whether the service flow is to be sent through a slave MiAN according to a preset strategy;

select a first slave MiAN to send the service flow if the result of the determination is yes; and send the service flow to the WAN via the WAN link corresponding to the master MiAN if the result of the determination is no; and send the service flow to the first slave MiAN so that the first slave MiAN sends the service flow sent from the master MiAN to the WAN via the WAN link corresponding to the first slave MiAN;

wherein the processor is configured to obtain a current link state parameter of the WAN link corresponding to the master MiAN, wherein the link state parameter comprises at least one of queue length, packet sending delay, throughput, Signal to Noise Ratio (SNR) and path loss; and the processor is configured to determine whether the current link state parameter exceeds a preset threshold and if yes, determine the service flow is to be sent through the slave MiAN; otherwise, determine the service flow is not to be sent through the slave MiAN.

11. A Mobile Internet Access Node (MiAN), which is an apparatus having both wide area network (WAN) accessing ability and wireless local area network (WLAN) accessing ability, and is connected to a WAN via a WAN link, establishing a communication link with one or more slave MiANs via a proximity interface, comprising:

a memory storing instructions; and a processor coupled to the memory running the instructions, wherein the processor is configured to:

receive a service flow sent from a wireless Internet device (WiD) to the WAN;

determine whether a route table item is established locally for the service flow after receiving the service flow; and if yes, send the service flow according to the route table item; otherwise, select a first slave MiAN to send the service flow;

determine whether the service flow is to be sent through a slave MiAN according to a preset strategy;

select a first slave MiAN to send the service flow if the result of the determination is yes; and send the service flow to the WAN via the WAN link corresponding to the master MiAN if the result of the determination is no; and send the service flow to the first slave MiAN so that the first slave MiAN sends the service flow sent from the master MiAN to the WAN via the WAN link corresponding to the first slave MiAN;

wherein the processor is configured to determine whether the service flow is a delay sensitive service flow; if yes, determine the service flow is not to be sent through the slave MiAN; otherwise, determine the service flow is to be sent through the slave MiAN.

12. A Mobile Internet Access Node (MiAN), which is an apparatus having both wide area network (WAN) accessing ability and wireless local area network (WLAN) accessing ability, and is connected to a WAN via a WAN link, establishing a communication link with one or more slave MiANs via a proximity interface, comprising:

a memory storing instructions; and a processor coupled to the memory running the instructions, wherein the processor is configured to:

receive a service flow sent from a wireless Internet device (WiD) to the WAN;

determine whether a route table item is established locally for the service flow after receiving the service flow; and if yes, send the service flow according to the route table item; otherwise, select a first slave MiAN to send the service flow;

determine whether the service flow is to be sent through a slave MiAN according to a preset strategy;

select a first slave MiAN to send the service flow if the result of the determination is yes; and send the service flow to the WAN via the WAN link corresponding to the master MiAN if the result of the determination is no; and send the service flow to the first slave MiAN so that the first slave MiAN sends the service flow sent from the master MiAN to the WAN via the WAN link corresponding to the first slave MiAN;

wherein the processor is configured to determine whether the master MiAN is a MiAN having the most optimal current link state of the WAN link in the aggregation system; if yes, determine the service flow is not to be sent through the slave MiAN; otherwise, determine the service flow is to be sent through the slave MiAN.

13. The MiAN according to claim 12, wherein the processor is configured to receive the current link state parameters of the respective WAN links transmitted periodically from the slave MiANs, wherein the link state parameter comprises at least one of queue length, packet sending delay, throughput, SNR and path loss; and the processor is configured to determine whether the master MiAN is a MiAN having the most optimal current link state of the WAN link in the aggregation system based on the current link state parameters of the master MiAN and the slave MiANs.

14. The MiAN according to claim 13, wherein the processor is configured to select a slave MiAN having the most optimal current link state out of the one or more slave MiANs as the first slave MiAN, based on the current link state parameters of the slave MiANs.

15. The MiAN according to claim 10, wherein the processor is configured to select randomly one slave MiAN out of the one or more slave MiANs as the first slave MiAN.

16. The MiAN according to claim 10, wherein the proximity interface is an interface for realizing a wired or wireless mutual communication.

17. The MiAN according to claim 16, further comprising:

a WLAN interface configured to connect with each slave MiAN of the one or more slave MiANs, wherein the proximity interface is a logic interface for sharing the WLAN interface, the master MiAN and the one or more slave MiANs work at a same WLAN frequency band, the one or more slave MiANs work in a mobile station mode and associate with the master MiAN via the WLAN interface.

18. The MiAN according to claim 17, wherein the processor is configured to maintain address information of the one or more slave MiANs, establish binding relations with the one or more slave MiANs, and establish communication links with the one or more slave MiANs via the proximity interface according to the address information.

* * * * *